United States Patent [19]

Chung et al.

[11] Patent Number: 4,908,637
[45] Date of Patent: Mar. 13, 1990

[54] FONT CARTRIDGE ADAPTER

[75] Inventors: J. M. Chung; Jerry Kung, both of Taipei, Taiwan

[73] Assignee: Acer Incorporated, China

[21] Appl. No.: 303,758

[22] Filed: Jan. 30, 1989

[51] Int. Cl.$^4$ .......................... G01D 15/00; G11C 5/06; G41J 29/02; G41J 5/51
[52] U.S. Cl. ..................................... 346/160; 400/121; 365/63; 361/394; 364/235.6; 364/519
[58] Field of Search ............... 361/390, 391, 392, 393, 361/394, 395, 397, 399; 400/61, 121; 346/45, 154, 108, 160; 364/519, 235.6; 365/63

[56] References Cited

U.S. PATENT DOCUMENTS

| | | | |
|---|---|---|---|
| 4,388,010 | 6/1983 | Mott | 361/395 |
| 4,660,998 | 4/1987 | Tsuneki | 400/121 |
| 4,660,999 | 4/1987 | Tsuneki | 400/121 |
| 4,715,006 | 12/1987 | Nagata | 346/45 |
| 4,778,291 | 10/1988 | Mitsuhashi | 400/121 |

FOREIGN PATENT DOCUMENTS 287776 12/1986 Japan .................... 400/121

Primary Examiner—Teresa J. Walberg
Assistant Examiner—Scott A. Rogers
Attorney, Agent, or Firm—Andrus, Sceales, Starke & Sawall

[57] ABSTRACT

A font cartridge adapter for inserting in the cartridge opening of the laser printer. Inserting a multiplicity of font cartridges in the cartridge insertion-end of this adapter, the user can select the desired font through the computer or control console of the laser printer and then print on single paper the different font for the characters or symbols. This invention comprises mainly the front shell and rear shell. The front shell, open on one side with the interior cavity being housed by a multiplicity of connector for the insertion of the font cartridges, also provides space for the installations of the printed circuit board and circuit board connector. The rear shell, open on side to engage with the opening side of the front shell, has cartridge insert-end and printer connector-end. The cartridge insert-end has a plurality of channels for accommodating the font cartridges; the printer connector-end has one channel for accommodating the circuit board connector while the printer connector-end is plugged in the font cartridge opening of the laser printer.

1 Claim, 2 Drawing Sheets

FONT CARTRIDGE ADAPTER

BACKGROUND OF INVENTION

The laser printer is a substitute for traditional printers these days in office automation equipments because of the well developed electric-optic technology.

The functions of the laser printer, including the print-out speed, resolution, font varieties, and font appearance, are superior to the traditional dot, or daisy printer, particularly in print-out of the extremely complicated documents.

The principle of the laser printer is to heat up the carbon particles and to adhere them on the paper in the same form as the document inputted to the laser printer. The shape or configuration variations of the characters and symbols printed on the paper can be achieved by using different font cartridges.

However, present laser printers can support only one font cartridge at one time; therefore, only the shape or configuration of characters and symbols built in that single font cartridge can be printed in the same document. This is a shortcoming of the prior art laser printers.

Therefore, the main object of this invention is to provide a font cartridge adapter, which can be inserted into the opening for font cartridges of the laser printer, whereby desired font cartridges can be situated in the inlets of the font cartridge adapter and to print in a single document a plurality of shape variations for the same character or symbol.

THE BRIEF DESCRIPTION OF THE DRAWINGS

DETAILED DESCRIPTION OF PREFERRED EMBODIMENTS

Figure 1:
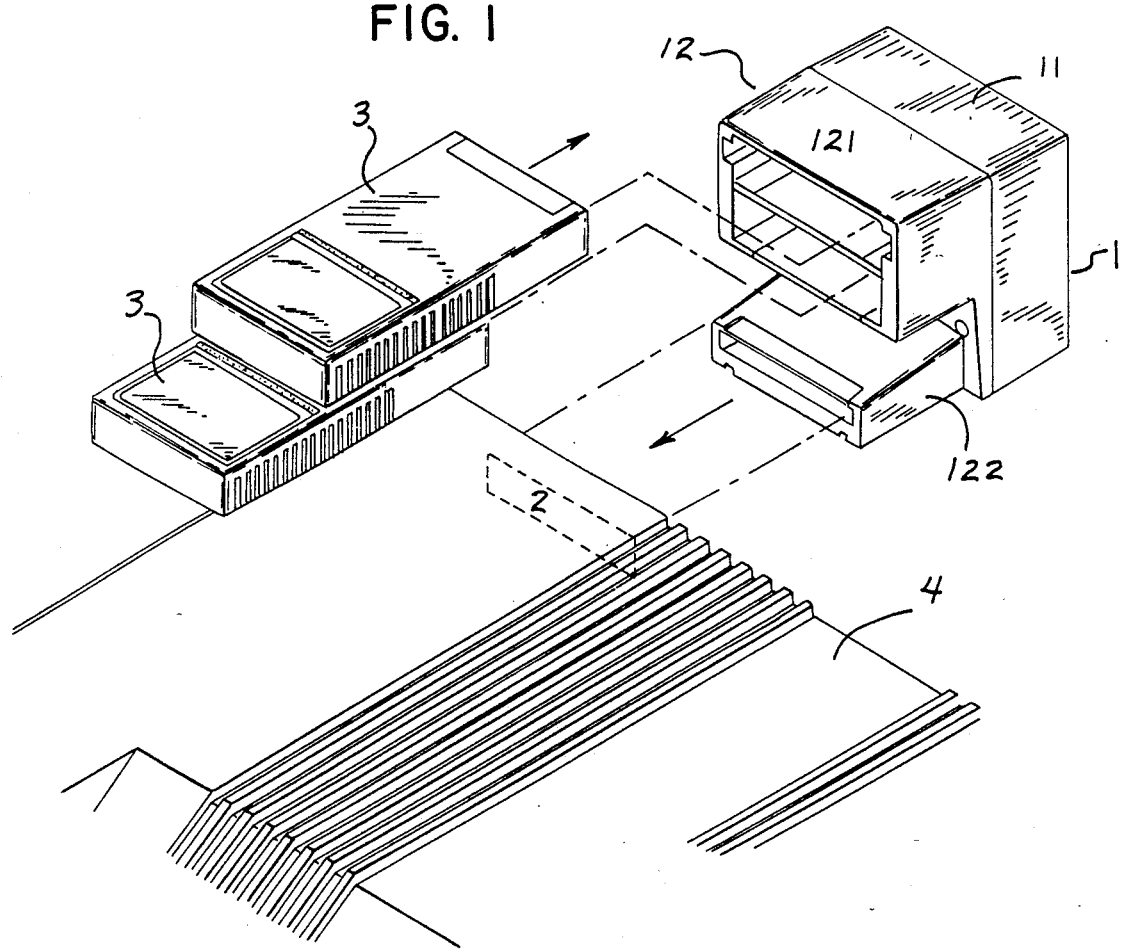
FIG. 1 is the perspective view of the invention.

Referring to the FIG. 1, this invention mainly comprises the front shell 11 and rear shell 12. The front shell 11, open on one side with the interior cavity housing a multiplicity of connectors 6 for the insertions of the font cartridges 3, (referring to the FIG. 2), provides space for the installations of the printed circuit board 7 and circuit board connector 5. The rear shell 12, open on the side to engage with the open side of the front shell 11, has cartridge insert-end 121 and printer connector-end 122. The cartridge insert-end 121 has a plurality of channels for accommodating the font cartridges 3; the printer connector-end 122 has one channel for accommodating the circuit board connector 5 when the printer connector-end 122 is plugged in the font cartridge opening 2 of the laser printer 4. There is a distance between the bottom surface of the cartridge insert-end 121 and top surface of the printer connector-end 122 to avoid the interference between the cartridge insert-end 121 and the laser printer 4 when the printer connector-end 122 is inserted in the opening 2 of the laser printer 4. In the embodiment of this invention, as shown in FIG. 1, the cartridge insert-end 121 comprises two conduits for the insertion of two font cartridges.

Figure 2:
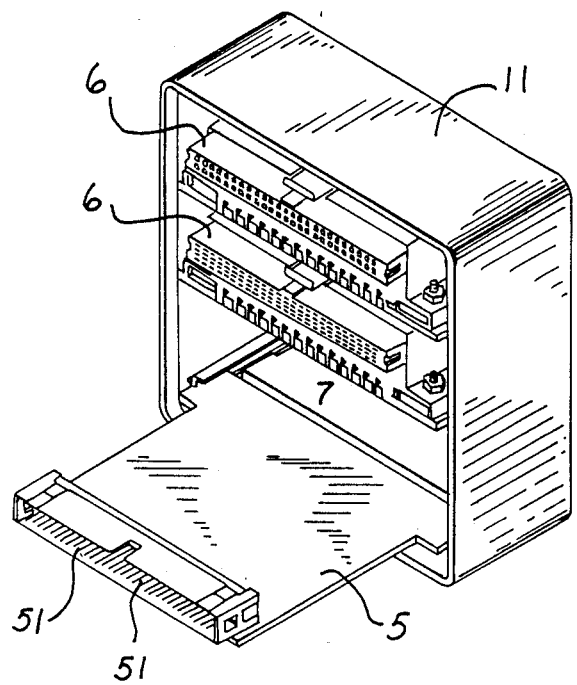
FIG. 2 is perspective view the internal structure of the invention.

As revealed in FIG. 2, the front shell 11 is open on one side with the upper part of interior cavity housing a multiplicity of connectors 6 for the insertion of the font cartridges 3. The lower part of the interior cavity near the bottom thereof has a slot for inserting the circuit board connector 5; the pins 51 of the outer-edge of the circuit board connector 5 are plugged in the connector built in the font cartridge opening 2 of the laser printer 4 with the control and data signals being transmitted through the circuit board connector 5. In between the slot, housing circuit board connector 5, and the connectors 6, there is a printed circuit board 7 for receiving the font selection signals from the laser printer or computer through the circuit board connector 5 and outputting the font selected to circuit board connector 5 through the connector 6 to function for switching and selection purposes.

Figure 3:
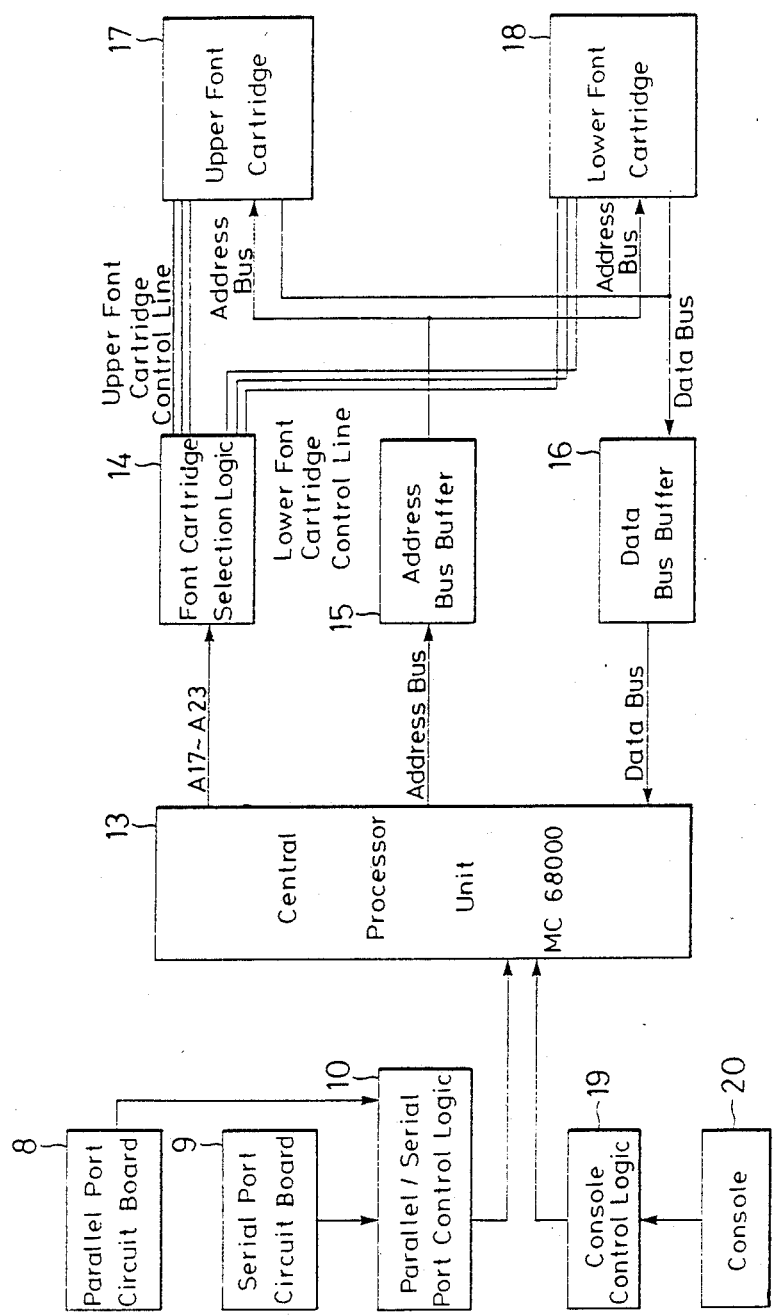
FIG. 3 is a block diagram showing the selection of desired fonts among the inserted font cartridges.

As shown in FIG. 3, to the user of the laser printer, there are three routes to select the desired font, namely the upper font cartridge or the lower font cartridge.

(1) Via parallel port circuit board 8 to transmit the selection signals to central processor unit 13.

(2) Via serial port circuit board 9 to transmit the selection signals to central processor unit 13.

(3) Via the control console 20 to transmit the selection signals to central processor unit 13.

Among the three routes, the parallel port circuit board 8 and serial port circuit board 9 are connected with the computer using the flat cables; and using the computer aided desk-top publishing software the font cartridge can be chosen with the font being chosen and varied in a single document. However, when control console 20 is chosen as the path, the push-buttons thereof are used to command the font cartridge selection. The command signals of the computer, through parallel/serial port circuit board, are outputted to parallel/serial port control logic 10 and therefrom to central processor unit 13; while the command signals of the control console 20 are sent to the central processor unit 13 through the console control logic 19.

When selecting the upper or lower font cartridge, the central processor unit 13 outputs the address signals A17-A23 to upper/lower font cartridge selection logic 14 for the cartridge selection. When selecting the specified character of symbol on the selected cartridge, the central processor unit 13 sends out the address of the specified character or symbol to upper or lower font cartridge 17,18 through address bus buffer 15. Thereafter, the font cartridge will place the data of that character or symbol on the data bus and thereby the data will be sent back to the central processor unit 13 through buffer 16.

When this invention is being used, the printer connector-end 122 of the font cartridge adapter 1 is inserted into the cartridge opening 2 of the laser printer 4 and then the wanted font cartridges 3 are respectively inserted into the channels of the cartridge insert-end 121. After the editing procedures described above on the monitor are completed, the printing can be commenced afterwards.

We claim:

1. A font cartridge adapter for inserting in the cartridge opening of a laser printer comprising:
    a font shell open on one side and having an interior cavity;
    connector means in which font cartridges can be inserted, said connector means being positioned in the upper part of the interior cavity of the front shell;
    slot means positioned in the bottom of the lower part of the interior cavity of said front shell;

a circuit board connector having one end inserted in said slot means;

means for receiving font cartridge selection signals from the circuit board connector, outputting the same to said connector means, and transmitting a data signal of the selected character or symbol from said connector means to said circuit board connector; and a rear shell open on one side to engage with the open side of said front shell, the other side of said rear shell having a spaced apart font cartridge insert-end and printer connector-end, the font cartridge insert-end having a plurality of channels for accommodating the font cartridges, the printer connector-end having a conduit for accommodating the circuit board connector and being insertable in the cartridge opening of the laser printer.

* * * * *